United States Patent [19]
Simonson

[11] 3,931,751
[45] Jan. 13, 1976

[54] COLLAPSIBLE MOUNTING FOR POWER SAW UNITS

[76] Inventor: Paul A. Simonson, Roseglen, N. Dak. 58775

[22] Filed: Nov. 13, 1974

[21] Appl. No.: 523,444

[52] U.S. Cl. .................. 83/859; 83/477.2; 83/701; 83/425
[51] Int. Cl.² .................. B27B 5/22
[58] Field of Search .......... 83/859, 477.2, 425, 701, 83/424, 648, 436, 437; 269/289, 290, 293, 309, 312; 144/286, 287

[56] References Cited

UNITED STATES PATENTS

| | | | |
|---|---|---|---|
| 635,107 | 10/1899 | Mershon | 83/436 |
| 1,127,092 | 2/1915 | Rosback | 83/436 X |
| 2,555,217 | 5/1951 | Young | 144/286 R |
| 3,342,226 | 9/1967 | Marcoux et al. | 144/286 R |

*Primary Examiner*—Donald R. Schran
*Attorney, Agent, or Firm*—Williamson, Bains & Moore

[57] ABSTRACT

Herein is disclosed a portable and collapsible mounting for numerous types of power saw units, which comprises a table-like device having an open frame top with adjustable hanger brackets for rigidly securing the base of a power saw unit thereto. Said frame top is supported by forward and rearward pairs of legs rigidly braced in use, but pivotally connected at their upper ends with the frame for swinging inwardly against the said top frame to compact the assembly of saw unit and mounting. In the compact or collapsed position the assembly may be readily rolled from place-to-place or pushed upon a transportation vehicle through the medium of special enlarged wheels which are mounted on bolsters depending from the rear portion of the table top construction. At each end of the table top frame of the mounting a pair of roller-supporting rails are slidably and adjustably mounted in the longitudinal sides of the top frame. The outer ends of said pairs of rails are rigidly interconnected by a transverse crosspiece which in turn adjustably carries upstanding roller support rods which in turn, at their upper ends, carry a shaft and self-aligning roller bearings upon which a central roller is mounted. The said roller may thus be adjusted by set screws working against said rods for various horizontal positioning for horizontal alignment with the upper or work surface of the power saw unit or for positioning above or below such surface. Upon such rollers, where the roller rails are extended beyond the sides of the frame, elongate and relatively wide workpieces such as wall paneling, plywood, elongate planks and the like may be accommodated and guided as indicated in dotted lines in FIG. 2 and as shown in full lines in FIG. 3.

6 Claims, 4 Drawing Figures

P
34
33
33a
31
30
29
26
19
6
19a
17b
10
14b
20a
21
13
15
S
A
U
X
W
6
17
11
17a
15a
9
20
16
5
7

P
29
31
30
31
34
33
33a
33a
33
34
30a
W
H
28a
28
28
L
8
27
7
26
26
9a
9a
11
5
8
19
19a
9
16
9
12
17
12b
12a
17b
17a
12a
12b
20
20

U
30
28a
28
W
H
30
28a
28
9a
26
6
21
8
8
10a
27
32
11
9
17b
12
20
10
19a
19

COLLAPSIBLE MOUNTING FOR POWER SAW UNITS

BACKGROUND OF THE INVENTION

Complete power saw units as conventionally manufactured and sold today include large heavy housings wherein are mounted electrical motor, a disc or jig saw, saw-tilting mechanism and in most instances mechanism for raising and lowering the saw in its slot relative to the top work surface of the unit. Such units are considered bench tools and, for convenient use, must be mounted upon a heavy bench or other support.

The prior art known to applicant and his attorney, while showing some table-type collapsible structures for receiving portable saw structures, fails to show strong, rigid collapsible devices for receiving and mounting a complete power saw unit and which may be moved from place-to-place to a shop or building or wheeled on wheels provided in collapsed position with the saw unit attached for portability and for transporting the saw to a truck or other transport device. Such prior art as is known to applicant fails to show any type of mounting for a power saw unit which inherently contained readily extensible and longitudinally adjustable roller-supporting devices or other guide means which enable wide somewhat flexible building material, such as wall paneling, plywood and elongate and wide lumber, to be accommodated.

It is a main object of my invention to provide a strong, durable, rigid mounting which will accommodate and secure complete power saw units of numerous different makes and in use will support the same at a bench or table height for convenient use, but which may be collapsed with supporting leg structures swung inwardly against the base of the power unit and top frame structure and will further, in such collapsed position, provide wheels making the assembly portable by lifting one end of the top frame and wheeling the assembled device upon a pair of wheels attached to the forward legs of the support.

It is a further object to provide longitudinally adjustable roller-carrying means mounting on rails which slidably engage the longitudinal members of a table-like frame for collapsing flush against the forward ends of the general mounting and which, in extended position, carry rollers or pluralities of rollers for supporting end portions of very elongate and wide material such as plywood and wall paneling.

DETAILED DESCRIPTION OF AN EMBODIMENT

From the following description, made in conjunction with the accompanying drawings, the structure, combinative relation of parts and operation of my invention will be fully apparent.

Figure 3:
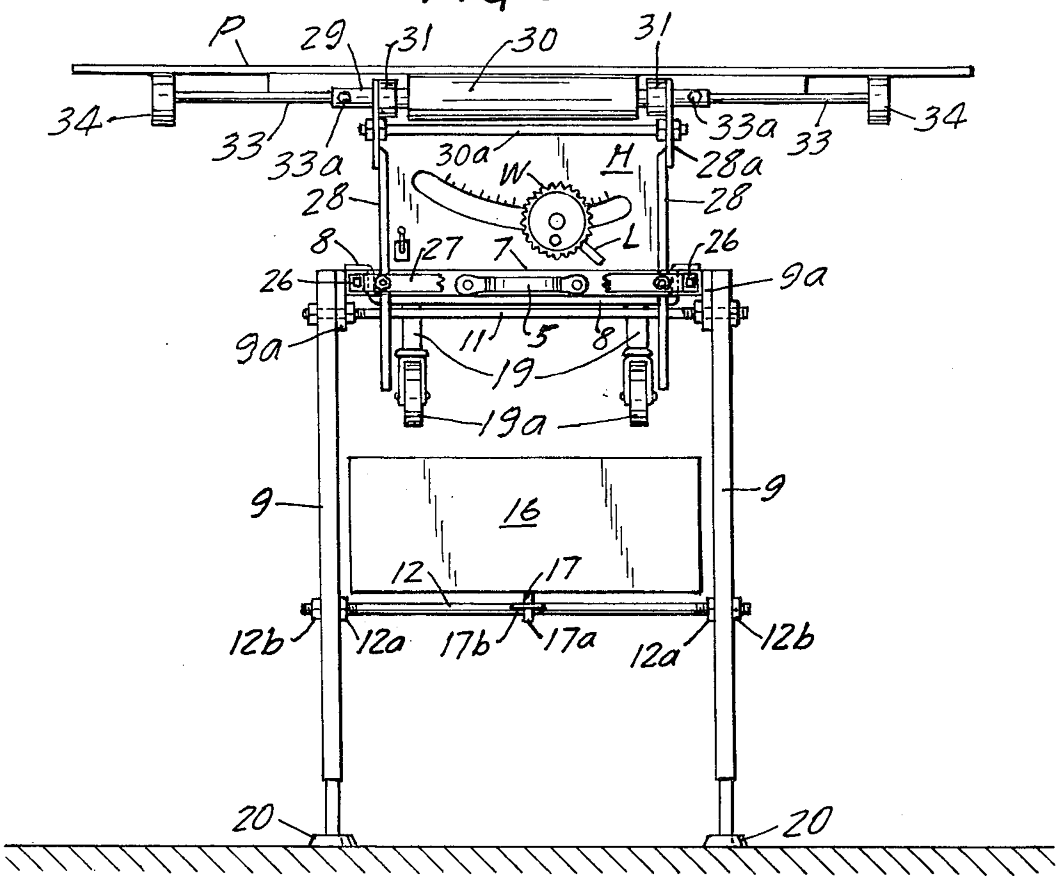
FIG. 3 is an end elevation of the same showing the guide rollers employed in outwardly extended position.

Referring now to the details of my portable mounting and the power saw unit affixed thereto, a conventional power saw unit, indicated as an entirety by the letter U, is employed having an upstanding rectangular housing H wherein (not shown) a suitable electric motor is housed as well as mechanism (not shown) for raising and lowering the protruding position of the circular saw S as well as mechanism for variably inclining the plane of the saw S with reference to its accommodating slot A. In FIG. 3, showing the forward end of the saw unit, knurled control wheel W is illustrated for varying the set elevational position of the saw and a lever L is shown for angling variably the saw blade through its relatively wide slot A.

My mounting structure comprises a table-like device having an openwork frame for the top thereof consisting in longitudinal rails 6, preferably constructed of rigid square tubes, interconnected near the ends thereof by transverse cross rails 7. The internal cross sectional structure of the rails 6 are unobstructed for slidable relation, as will later be described, of longitudinally extensible support beams or rails for auxiliary guiding means.

For adjustable mounting of power saw units varying in dimensions, rigid hanger brackets 8 are employed having slidable relation with the longitudinal rails 6 and having underlying rigid horizontal projections **8*a* for support of and securance to the underlying base portion of the saw unit U. Obviously the hanger brackets 8 may be adjustably disposed relative to rails 6, and in any event support the power saw unit U with the top or work surface thereof X being disposed high above the rails 6**.

The rigid openwork frame comprising the rails 6 and the rigidly secured crosspieces 7 is supported in operation upon two pairs of rigid legs 9 and 10. The upper ends of forward legs 9 are interconnected by a rigid cross rod 11 having its terminal portions affixed to said legs by inner and outer clamping nuts **12*a* and 12*b*. The cross rod 11 serves also, in addition to bracing the upper ends of legs 9, an trunnions for pivoting said legs upon depending heavy mounting brackets 9*a* which may be welded or otherwise secured to the outer faces of the longitudinal rails 6. Similarly the rear legs 10 are reinforced and interconnected at their upper ends by rigid cross shaft 13 having the terminal portions thereof clamped by inner and outer nuts 14*a* and 14*b*** to the legs.

With such pivotal connections the two sets of legs 9 and 10 may, for compactness and portability of the mounting, be swung inwardly upon the respective mountings **9*a* and 10*a*** and, in collapsed position, will abut against the underside of the housing of the saw unit or against cross portions of the top frame structure.

Rigid bracing media disposed at the sides of the table-like mounting is provided in the form of toggle structure 15, such toggle structure being provided for each of the forward and each of the rearwad legs. The links of the toggle are suitably pivoted through the longitudinal sides of rail 6 and in operation extend diagonally with the lower links thereof pivoted on pivots **15*d* to appropriate intermediate portions of the respective legs 9 and 10. The links of the toggle structure, as shown, are swingably connected on a common removable pin 15***a* which, as shown in each instance, is connected by a chain 15*b* with the appropriate pivots 15*d*. Abutments 15*c* for dead center engagement with the upper toggle links are provided at the inner ends of the lower toggle links.

For further bracing and connection of the two pairs of legs 9 and 10 an elongate horizontal removable link 17 is centrally provided for connecting cross rods 9*a* and 10*a* respectively. The elongate longitudinal rod 17 has hooked ends 17*a* which snugly fit the cross rods 9b and 10b, respectively, the retaining clips 17*b*, may be provided on the respective cross rods for retaining the hooks 17*a* against lateral displacement.

From the foregoing description it will be seen that with the efficient bracing of the legs through upper cross rods 11 and 13, intermediate cross rods 9b and 10b, toggle structures 15 and elongate center rod 17, a very rigid overall mounting is provided for the relatively heavy power saw unit U.

Figure 4:
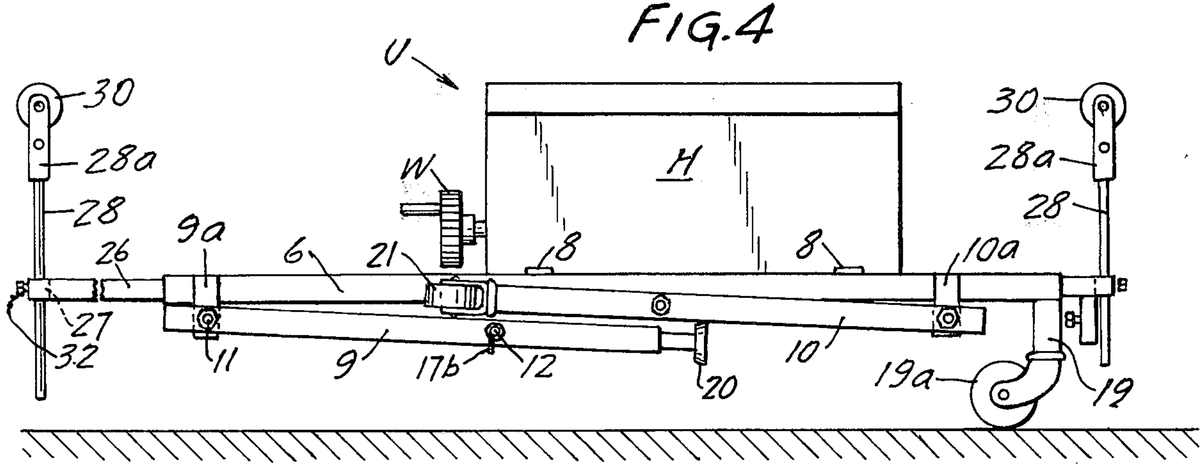
FIG. 4 is a side elevation of the mounting and saw unit with the mounting collapsed for storage or portability.

For convenient portability of the assembled unit in collapsed position as shown in FIG. 4, I provide rigid depending bolsters 19 rigidly secured, as by welding, to the rear corners of the upper table frame. Bolsters 19 are preferably tubular and carry caster wheels 19*a* which, in the collapsed position of the assembly, as shown in FIG. 4, engage the floor or ground and serve as means for wheeling the entire assembly when the same is slightly lifted at the forward end as by a suitable handle 5 (see FIG. 4).

As shown, the forward legs 9 of my mounting are supported on stationary shoes 20 having vertical shanks which are adjustably secured to the bottom of legs 9 by set screws 20*a*. To permit portability of the entire assembly in erect condition I prefer to provide caster wheels 21 swivelly connected with the lower ends of the two rear legs 10 and having shanks, not shown, adjustably securable by set screws 21*a*. Flanged eccentric braking devices 22 are mounted on the caster brackets for snubbing the caster wheels 21 when the assembly is positioned for work.

An important feature of my invention is the provision of extensibly adjustable mechanism for supporting and guiding elongate and wide board pieces such as plywood and panels and elongate planks for sawing. As illustrated and preferably at front and rear ends of the table-like mounting structure, square rigid rods 26 are provided conveniently slidably accommodated in the open-ended longitudinal rails 6 of the top frame. The outer ends of each of said pair of slidable beams 26 are interconnected by a rigid crosspiece 27 (see FIGS. 3 and 4). Crossbars 27 adjacent the ends thereof are provided with vertical bores for adjustably receiving upstanding roller support arms 28 which have affixed to the upper ends thereof rigid brackets 28*a* for receiving a tubular roller shaft 29 upon which a transverse horizontal roller 30 is mounted for free rotation. Self-aligning bearings 31 are provided for the roller and its trunnion ends 30*a*. To adjust the height of the roller-supporting vertical rods 28, set screws 32 are provided associated with the bores of the crosspiece of head 27 which interconnect the outer ends of the extensible beams 26.

As an optional feature of my invention provision for width extension of supporting and guiding means may be employed. To this end the tubular roller shafts 29 may slidably receive rigid extension rods 33 adjustably secured by set screws 33*a*. The outer ends of the extension rods 33 have revolubly mounted thereon narrow auxiliary rollers 34. Such additional structure provides width adjustment roller support beyond the capacity of the large central rollers 30 when extremely wide work-sheets are to be processed. Said extension structure is removed from my mounting as shown in FIG. 1.

From the foregoing description it will be seen that a compact, rugged mounting has been provided for conventional power saws of practically all variations and makes. The mounting structure may be collapsed as shown in FIG. 4 into very compact form and when so collapsed with the power saw unit mounted thereon may be wheeled from place-to-place.

Figure 1:
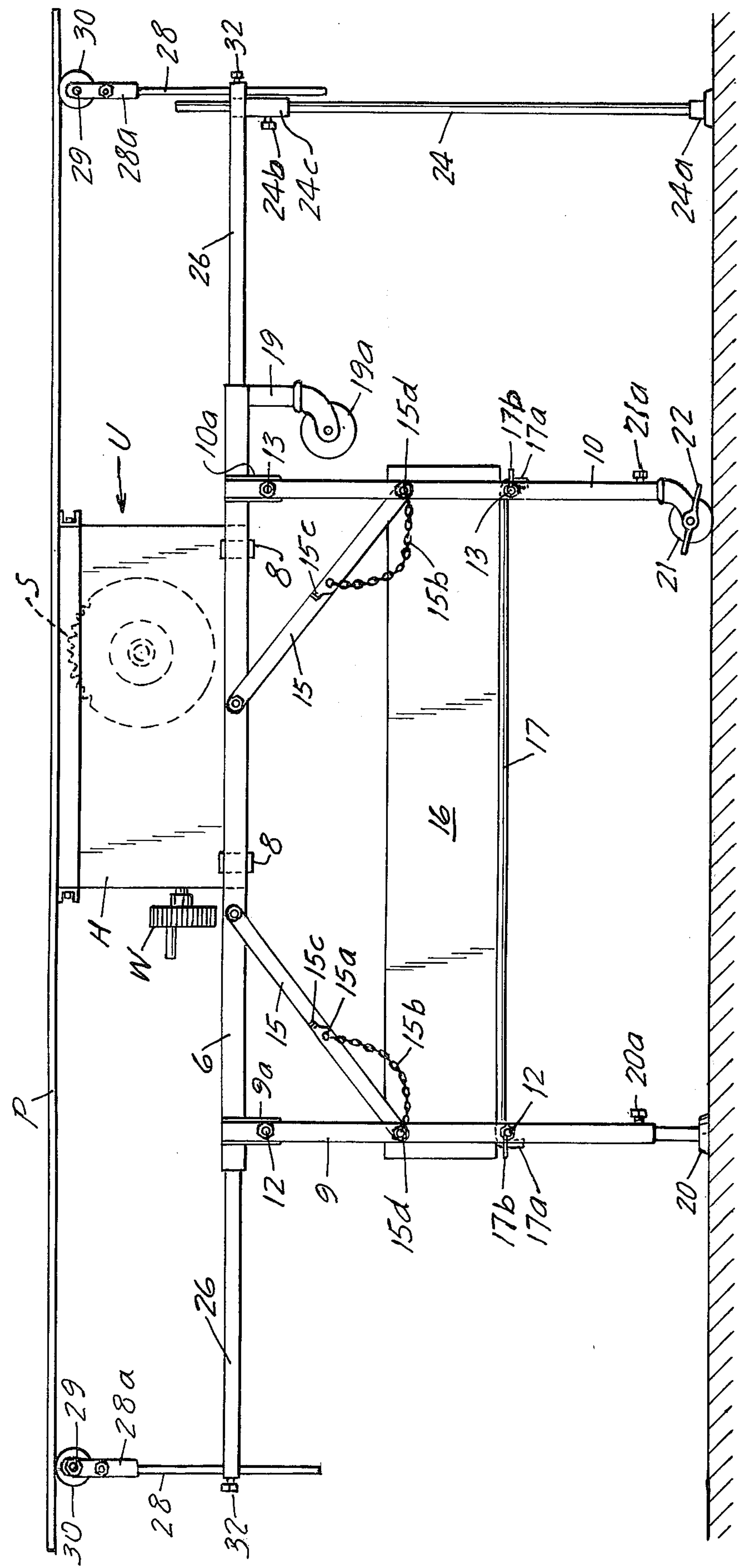
FIG. 1 is a side elevation of an embodiment of the invention positioned with the guide roller extensions being employed and with a wide building material, such as plywood, being supported jointly by the guide rollers and the top or working surface of the power saw unit.
Figure 2:
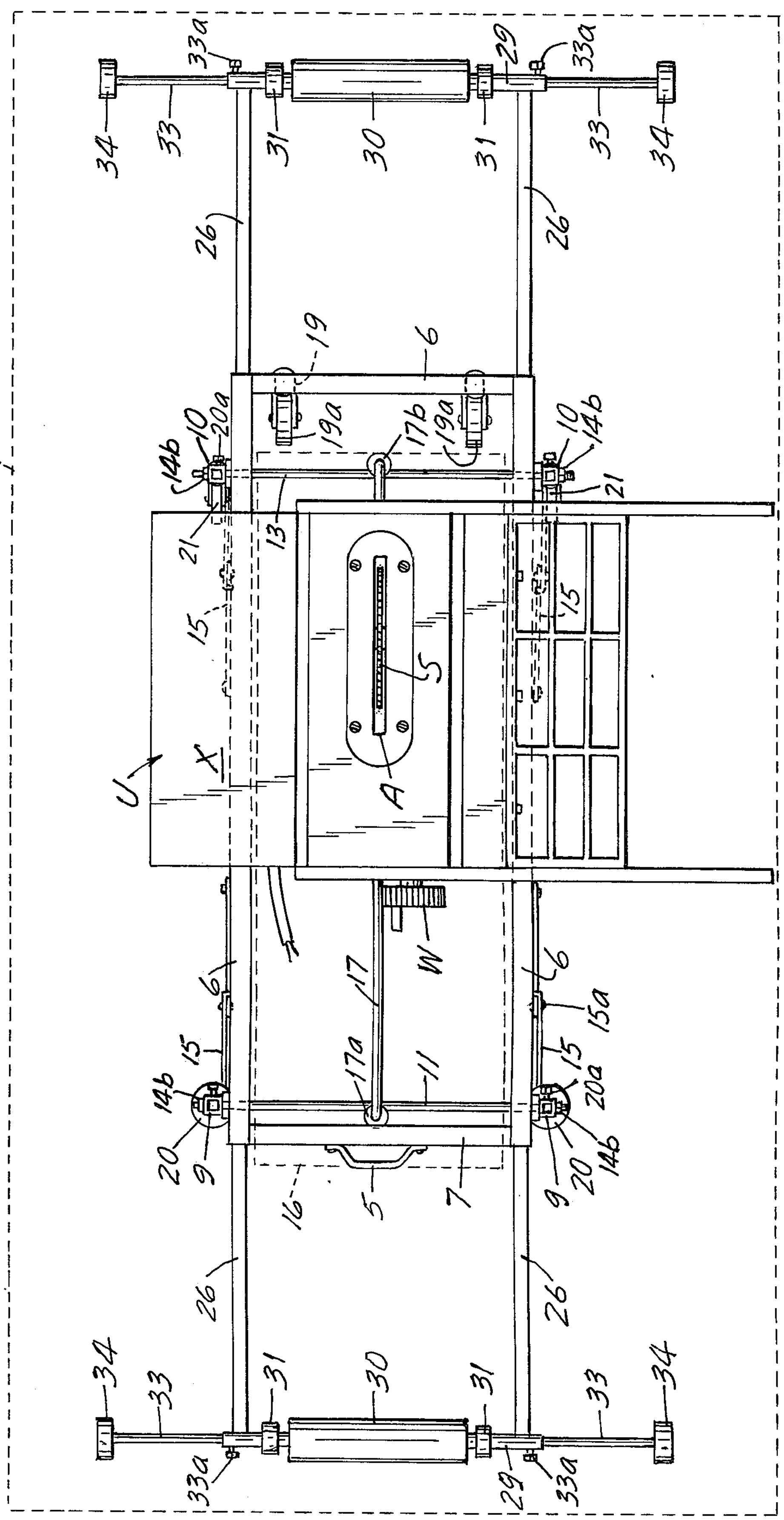
FIG. 2 is a top elevation of the same, dotted lines indicating overall dimensions of the plywood panel supported for longitudinal cutting on the roller extensions.

While the table-mounting structure involves relatively few parts, it is rigid and sturdy in operative position as shown in FIGS. 1 to 3. Ordinarily the additional extension rollers 34 with their supporting shafts 33 are not required, but this optional feature provides simplified medium for supporting extremely wide work-pieces.

In the operation of the saw, the work material, such as lumber, boards, plywood and wall panels, smoothly rolls towards the saw through the guiding means of the operator.

It will of course be understood that numerous minor changes and uses of equivalent elements may be made in the overall combination without departing from applicant's invention.

The table top frame with the square tubular rails 6 accomplishes multi-functions, serving as guideways and supports for the collapsible beams 26 which carry the roller mountings and serving also to rigidify with its connected braces the entire framework as well as support through the hanger brackets 8 the relatively heavy power saw unit.

What is claimed is:

1. A portable and collapsible mounting for conventional power saw units having in combination:

a rectangular rigid table top having front and rear ends and longitudinal sides, means adjustably secured to said table top for supporting a power saw unit with its planar, material-supporting surface disposed above said table top, a plurality of legs connected at their upper ends for rigid relation with said table top, said legs being collapsible for compactness and portability of said assembly, bracing means between said table top and said legs and also between said legs for rigidifing said structure in use, horizontal support means slidably mounted in said table top and extensible longitudinally of said top, said support means near the outer end thereof carrying upstanding elements upon which are mounted support and guide means for slidably supporting work material at an elevation substantially aligned with the work-supporting surface of said saw unit.

2. The structure and combination defined in claim 1 wherein:

said legs are swingably mounted at their upper ends upon said table top for inward collapsing against the same, and wheel means secured to the longitudinal marginal portion of said top disposed below the collapsed position of said legs and adjacent the rear end of said table top for enabling the mounting and power saw assembly to be wheeled from place-to-place.

3. The structure and combination set forth in claim 1 wherein:

said extensible structure includes a pair of parallel horizontal beams slidably mounted in longitudinal marginal portions of said table top and interconnected rigidly at their outer ends, vertically adjustable upstanding roller support means secured to and supported from the outer end of said support beams, a horizontal workpiece-guiding roller mounted for free rotation on said last-mentioned means for cooperating with the work-receiving surface of said saw unit to support and guide relatively elongate and wide workpieces such as plywood and wall panels.

4. The structure and combination set forth in claim 1 wherein:

said rectangular table top comprises a pair of parallel spaced longitudinal tubes with means rigidly interconnecting the terminal portions of said tubes, said horizontal support means constituting rigid beams telescoped within and slidable within said longitudinal rails.

5. The structure and combination set forth in claim 3 further characterized by:

readily connectible extension roller devices comprising extension rods with means for connection to the outer end of said roller support means and in alignment therewith, and narrow rollers rotatably mounted on the ends of said extension rods.

6. The structure and combination defined in claim 1 wherein:

said rectangular table top is in the form of a rigid frame having tubular longitudinal support rails and rigid interconnections between the respective ends of said rails, hanger brackets adjustably securable to said rails for constituting the supporting means of said power saw unit, horizontally adjustable extensible structure for roller, workpiece-support and guiding means employing a pair of horizontal beam members slidably telescoped with said longitudinal rails at one end of said frame, said beams being interconnected at their outer ends by a rigid bar, means adjacent the ends of said bar for adjustably receiving upstanding roller-support arms, and a central elongate roller rotatably mounted from the upper ends of said upstanding support arms.

* * * * *